Aug. 30, 1932. J. S. KEEN 1,874,306
SIX-WHEEL TENDER TRUCK
Filed Dec. 19, 1931 3 Sheets-Sheet 1
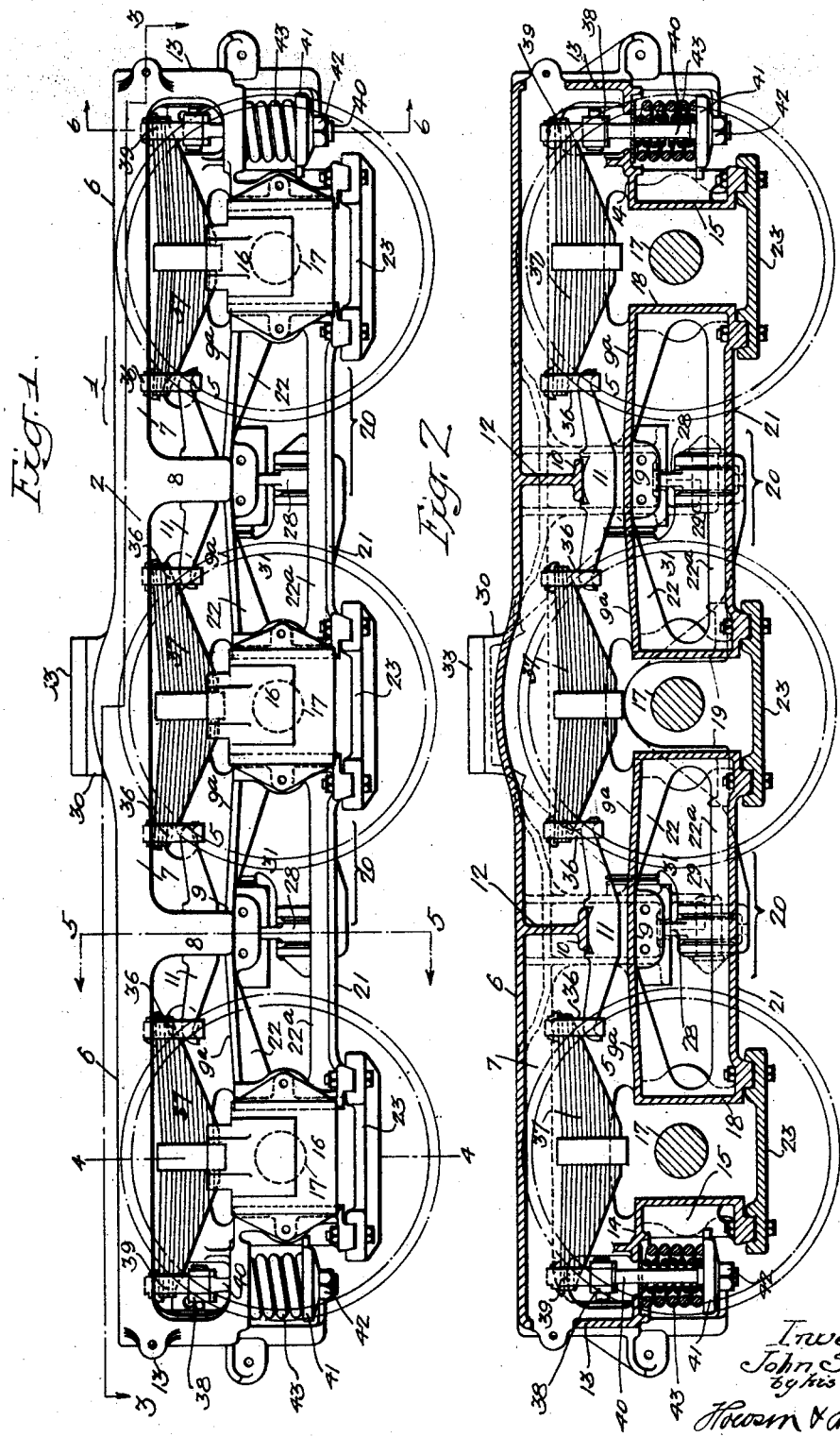

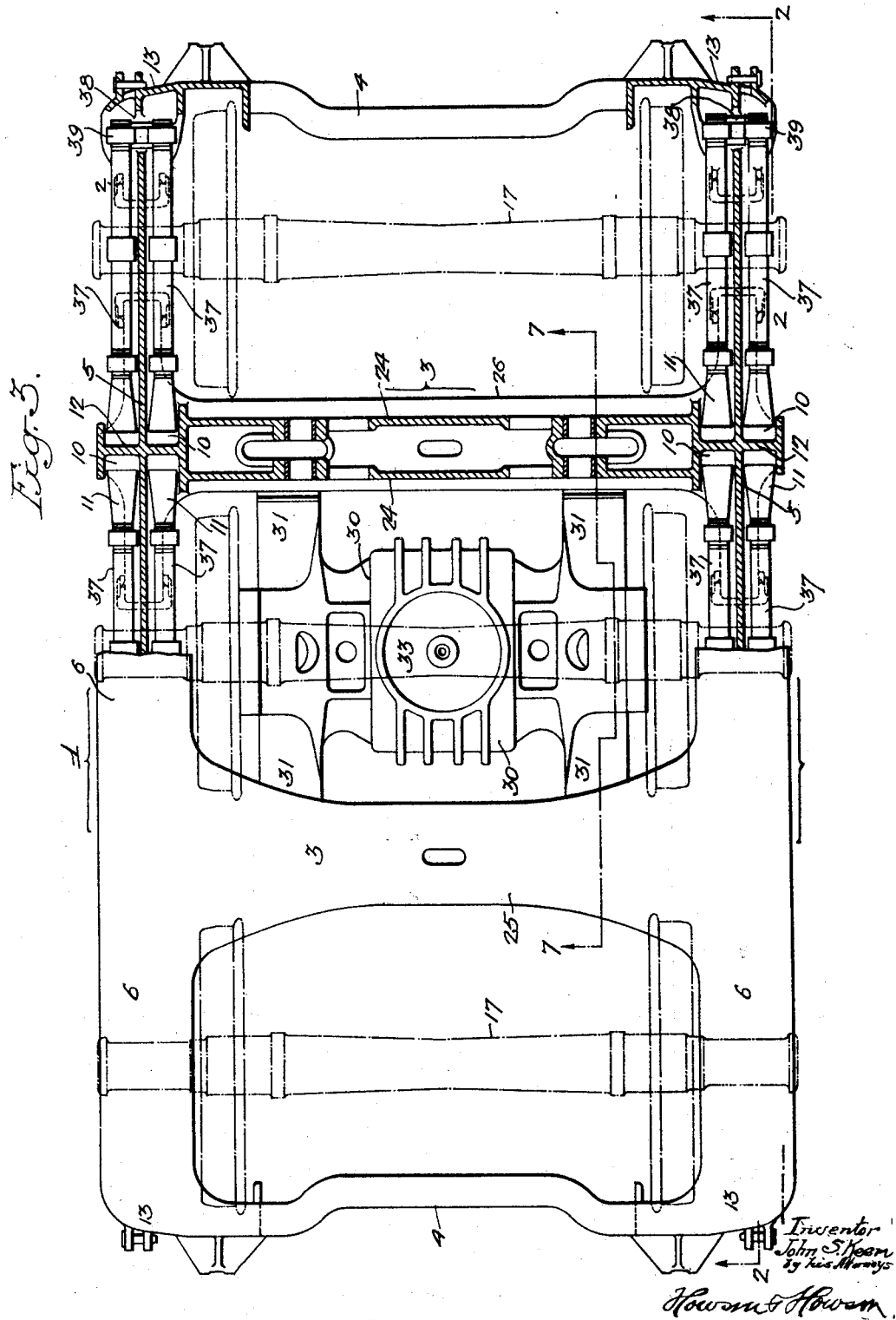

Aug. 30, 1932.  J. S. KEEN  1,874,306
SIX-WHEEL TENDER TRUCK
Filed Dec. 19, 1931  3 Sheets-Sheet 3
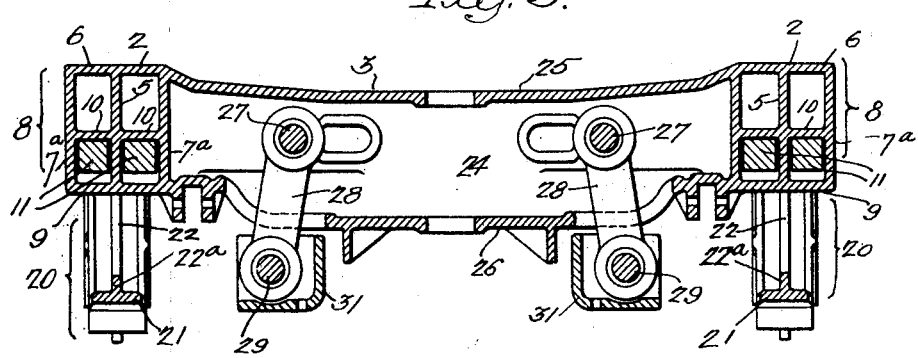
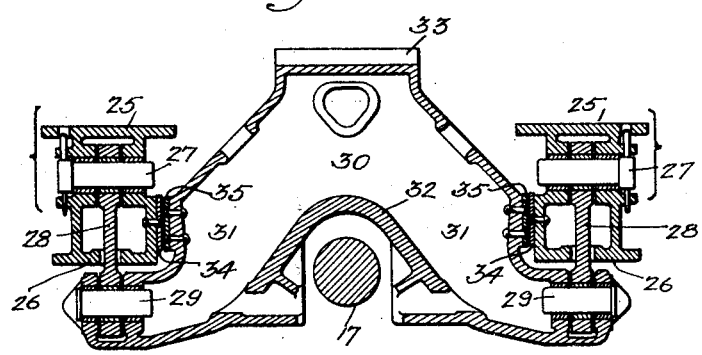
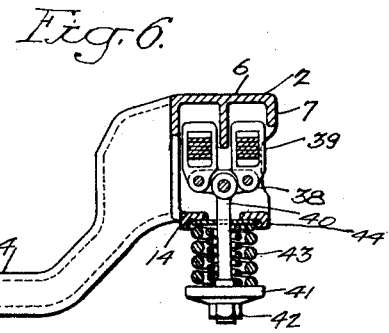
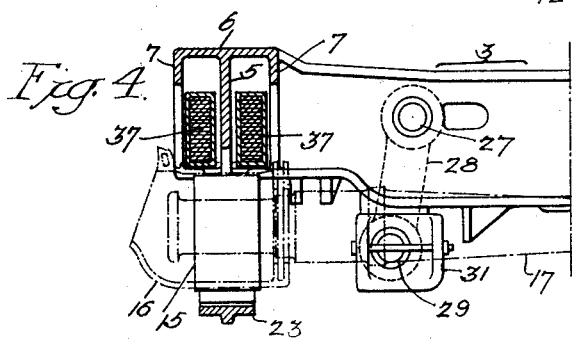

Patented Aug. 30, 1932

1,874,306

UNITED STATES PATENT OFFICE

JOHN S. KEEN, OF PHILADELPHIA, PENNSYLVANIA

SIX-WHEEL TENDER TRUCK

Application filed December 19, 1931. Serial No. 582,125.

My invention relates to improvements in six-wheel trucks, especially the trucks designed to carry the tender of a locomotive.

One object of my invention is to make the frame of the truck as an integral casting and to so design the side members of the truck that the spring equalizing mechanisms which are arranged in pairs will be exposed throughout the length of the side members, one set of springs and levers being exposed on the outer side of each side member, and the springs and levers of the other set being exposed on the inner side of the side members.

A further object of the invention is to so design the equalizing gear of the truck that the springs and levers are arranged in pairs on each side of a central web and that the end springs of each pair are connected by cross equalizers, the load being transmitted to the frame through a single link and coil springs.

In the accompanying drawings:

Fig. 1 is a side view of my improved truck;

Fig. 2 is a longitudinal sectional elevation on the line 2—2, Fig. 3, the axle boxes being omitted and the axle shown in section;

Fig. 3 is a plan view partly in section on the line 3—3, Fig. 1;

Fig. 4 is a transverse sectional view of a portion of the truck taken on the line 4—4, Fig. 1;

Fig. 5 is a transverse sectional view on the line 5—5, Fig. 1;

Fig. 6 is a sectional view on the line 6—6, Fig. 1; and

Fig. 7 is a sectional view on the line 7—7, Fig. 3.

Referring to the drawings, 1 is the frame of the truck, made as an integral casting and having side members 2 and transverse members 3 located at each side of the transverse center of the truck and forming rigid supports for the side members. 4 are the end members of the truck, which are made integral with the frame in the present instance. Each side member of the truck has a central web 5 extending the full length of the truck and 6 are the top members of the side frame, having deep flanges 7 at each side, as shown in Fig. 4, to provide sufficient strength for the structure of the side frames.

At the points where the cross members 3 of the frame connect with the side members, each side frame is in the form of a box-like structure 8, the flanges 7—7 being extended to form the inner and outer walls 7a of the said box-like structure and a bottom member 9 connects these side members 7a with the web 5. Cross members 10, midway between the top and bottom of the box-like member, form supports for the equalizing levers 11. The central portion of the levers are rounded at their upper edges where they bear upon the members 10 as shown in Fig. 2, and are flanged at each side of the rounded portions so as to be held against longitudinal movement by the members 10.

A transverse member 12, integral with the truck frame, extends from one side member 7a to the other, so as to additionally reinforce the box-like structure 8. It will be noticed that the equalizing levers and springs are arranged in pairs, one of each pair being on the outside of the longitudinal central web 5 of the side frame and the other on the inside thereof.

The top members 6, as well as t]e web 5, are connected to end members 13 of the truck frame and these end members in turn are connected by lower horizontal webs 14 with the outer pedestals 15 for the axle boxes 16.

The axles 17 of the truck are shown in section in Fig. 2 simply indicate their location. The inner pedestals 18 for the end boxes are connected to the pedestals 19 for the central box by a box-like structure 20, which is an integral part of the frame. The lower member 9 of the box-like structure 8 is extended as at 9a and forms the top of the box-like structures. The lower member 21 of each box-like structure 20 is connected to the lower ends of the pedestals as clearly shown in Figs. 1 and 2, and internal webs 22—22a are on a line with the web of the side frame 5, the space between the webs being open for inspection of the truck at this point. Each pair of pedestals is connected together by the usual plates 23.

By the above construction it will be seen that the frames of the side members are formed as integral castings, so that the side frames are very substantial and rigid and are connected by the heavy cross-members 3. These cross-members have longitudinal webs 24 and a wide top plate 25, and a narrow lower plate 26.

Mounted in these cross-members 3—3 are pins 27, on which are hung the links 28, which are connected to pins 29 mounted in the arms 31 of the bolster 30, Fig. 7, the bolster being arched as at 32 so as to clear the central axle 17. On the upper portion of the bolster is the usual center pin bearing 33, on which is mounted the body bolster of the tender or other car body.

Secured to the cross-members 3 are wear plates 34, Fig. 7, and secured to projections of the bolster 30 are wear plates 35.

The equalizing levers 11 are connected at each end by links 36 to the ends of springs 37. These springs rest on the boxes 16, as shown in Fig. 1. The springs, as well as the equalizing levers, are arranged in pairs, as clearly shown in Fig. 3, one set of springs and levers being located on the outer side of the longitudinal web 5 and the other set are located on the inner side of the web, but the space between the flanges 7 of the top member 6 of each side frame and the box-like structures 20 is such that the springs and the major portions of the equalizing levers are entirely exposed to view, both on the outside and the inside of each side frame, so that access can be had to all the equalizing mechanism and the equalizing mechanism can be readily inspected.

It will be noticed in referring to Figs. 1 and 2 that the web 5 is reduced in depth above the boxes so as to give clearance to the boxes but the other parts of the web are deep and the webs 22 within the box-like structures 20 are a continuation of the central web, so that the web materially reinforces the pedestals of the truck and the pedestals are also reinforced by the horizontal members 9a and 21, which connect the pedestals.

The outer ends of the two end springs at each end of the truck are connected together by a cross equalizer 38, the ends of the cross equalizer being connected to the ends of the springs by links 39, and pivotally connected at the center of the cross equalizer is a single link 40, which extends through an opening in the frame and has at its lower end a spring seat 41, held by a nut 42. Two coil springs 43 in the present instance, one located within the other, rest on the spring plate 41 and bear upon a plate 44 at the underside of the horizontal portion 14 of the frame, Fig. 2, so that the equalizing mechanism is anchored to the side members of the truck frame at each end thereof.

I claim:

1. An integral frame, for a six-wheel truck, consisting of side members and two cross-members spaced apart, each side member having a central web and a top plate extending the full length of the truck, the said top plate having deep flanges in each side, and box-like structures at the two cross members forming bearings for equalizing levers on each side of the central web of the side members; a series of pedestals and box-like structures integral with the frame and connecting the inner pedestals for the outer boxes with the pedestals for the central box; and integral frames connecting the outer pedestals for the outer boxes with the frame, the entire structure being made as an integral casting.

2. The combination in a six-wheel truck, of a frame having two side members and cross-members connecting the side members, each side member having a central longitudinal deep web extending the full length of the side member and having a top member projecting at each side of the central web and also extending the full length of the side member, the top member having deep flanges at each side; a series of pedestals for axle boxes, said pedestals forming an integral part of the frame; box-like structures connecting the pedestals for the central box with the pedestals for the outer boxes, the space on each side of the central web between the said box-like structures and the depending flanges of the upper plate being open; and equalizing mechanism in the said space on each side of the central web, the equalizing mechanism at each end of each side frame being connected together and to the frame.

3. The combination in a six-wheel truck, of an integral frame consisting of two side members and cross-members; axle box pedestals in the side members of the frame, each side frame having a deep central web; a top plate with deep outer flanges; upper and lower horizontal members connecting the pedestals of the central axle box with the pedestals of the outer axle boxes, the side flanges of the top plate being extended midway between the several axle boxes and forming box-like structures; equalizing levers extending through said box-like structures on each side of the web and springs on each side of the web above the space for the axle boxes and arranged to bear upon the axle boxes; links connecting the springs with the equalizing levers; and a cross equalizer at each end of the truck connecting the ends of the springs on each side of the central web and with the frame, the space below the flanges of the top plate being open to the upper horizontal members so as to expose the springs and equalizing levers on the inner and outer side of the longitudinal web.

4. The combination of a frame of a six-wheel truck having side members, said side members being cast as an integral structure and having a central web extending the full length of the side member; axle boxes; pedestals formed integral with each side member for the central axle box and end axle boxes; a top member having depending flanges at each edge extending substantially the full length of the truck; two box-like structures forming pivot bearings for equalizing levers, midway between the pedestals for the axle boxes, the central web extending through the box-like structure and having cross members, the flanges of the top plate being extended to form the side walls of the box-like structures, the lower members of the box-like structures being attached and connecting the upper ends of the pedestals for the central axle box with the inner pedestals for the end boxes; a horizontal plate at each end of the frame and integral therewith, and connecting the outer pedestals at each end of the truck with the ends of the frame; equalizing levers extending through the boxes of the frame and having their bearings on the cross members within the boxes; equalizing springs arranged to rest on the axle boxes; and links connecting each end of each equalizing lever with the springs, the outer ends of each end spring being connected to the body of the truck, the equalizing mechanism being exposed to view under the deep flanges of the top plate.

5. The combination of a frame of a six-wheel truck having side members, said side members being cast as an integral structure and having a central web extending the full length of the side member; axle boxes; pedestals formed integral with each side member for the central axle box and end axle boxes; a top member having depending flanges at each edge extending substantially the full length of the truck; two box-like structures forming pivot bearings for equalizing levers, midway between the pedestals for the axle boxes, the central web extending through the box-like structure and having cross members, the flanges of the top plate being extended to form the side walls of the box-like structures, the lower members of the box-like structures being attached and connecting the upper ends of the pedestals for the central axle box with the inner pedestals for the end boxes; a horizontal plate at each end of the frame and integral therewith, and connecting the outer pedestals at each end of the truck with the ends of the frame; equalizing levers extending through the boxes of the frame and having their bearings on the cross members within the boxes; equalizing springs arranged to rest on the axle boxes; and links connecting each end of each equalizing lever with the springs, the outer ends of each end spring being connected to the body of the truck, the equalizing mechanism being exposed to view under the deep flanges of the top plate, the pedestals for the central axle box being connected at their lower ends to the lower ends of the inner pedestals for the end axle boxes by longitudinal members having webs, said members being integral with the truck frame.

JOHN S. KEEN.